July 30, 1935.  E. G. CARROLL  2,009,433
HYDRAULIC BRAKE
Filed March 4, 1932

INVENTOR.
EUGENE G. CARROLL
BY Jerome R. Cox
ATTORNEY

Patented July 30, 1935

2,009,433

UNITED STATES PATENT OFFICE 2,009,433

HYDRAULIC BRAKE

Eugene G. Carroll, South Bend, Ind., assignor to Bendix Aviation Corporation, South Bend, Ind., a corporation of Delaware Application March 4, 1932, Serial No. 596,807

1 Claim. (Cl. 60—54.5)

This invention relates to brakes and more particularly to hydraulic brakes.

Hydraulic brake systems utilize liquids to transmit force from its source of application to the brakes. In order that the transmission shall be efficient and satisfactory, it is necessary that the liquid shall be substantially incompressible and it is therefore necessary that it shall be substantially free of air and other gases. The operation of eliminating the gases from the system is known as bleeding and is usually performed before the system is put into operation and as often thereafter as may be necessary. Heretofore, the operation of bleeding has usually been accomplished by opening an outlet leading from each of the wheel cylinders in succession and forcing liquid through the system and out of said outlet. Such systems require one or more valves within the operating portion of the systems and inasmuch as valves sometimes become stuck, such systems are sometimes subject to operating difficulties.

Furthermore, the valves employed are usually spring loaded to maintain a certain pressure. As the springs deteriorate with use, the pressures which are maintained vary with accompanying disadvantages.

One of the objects of my invention is to provide an improved means for bleeding hydraulic brake systems.

A further object is to provide a hydraulic brake system normally maintained under atmospheric pressure and not dependent for its operation upon ordinary valves or springs.

An important feature of my invention relates to the use of a bleeding hose provided with a check valve and adapted to be used only during the bleeding operation and then adapted to be secured in turn to each of the wheel cylinders.

A further feature relates to means for sealing the wheel cylinders to insure against the sucking in of air during the bleeding operation.

Further features relate to the construction of the wheel cylinders, the master cylinder, and the supply reservoir all designed to contribute to the efficient functioning of a hydraulic brake system which may be maintained normally under atmospheric pressure and which does not depend for its operation upon ordinary valves or upon springs.

Figure 1:
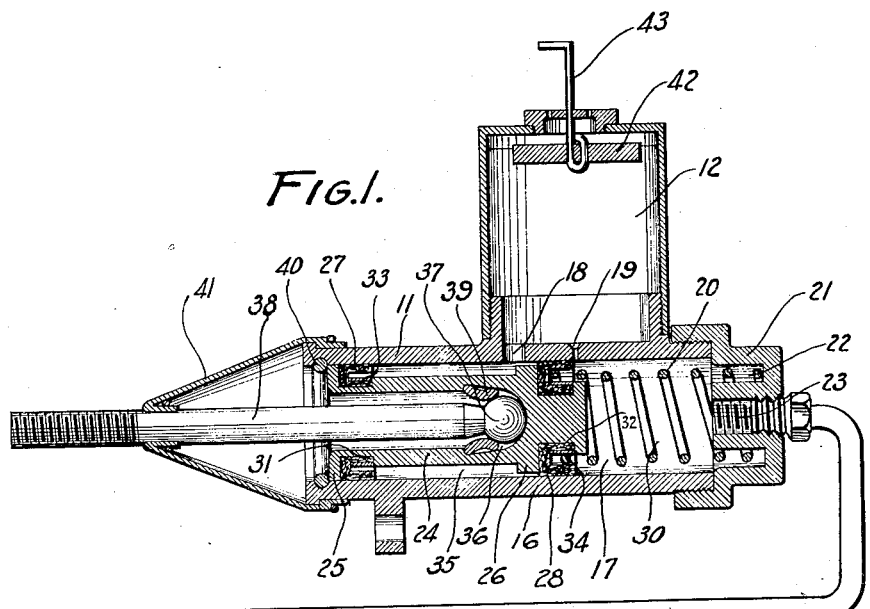
Figure 2:
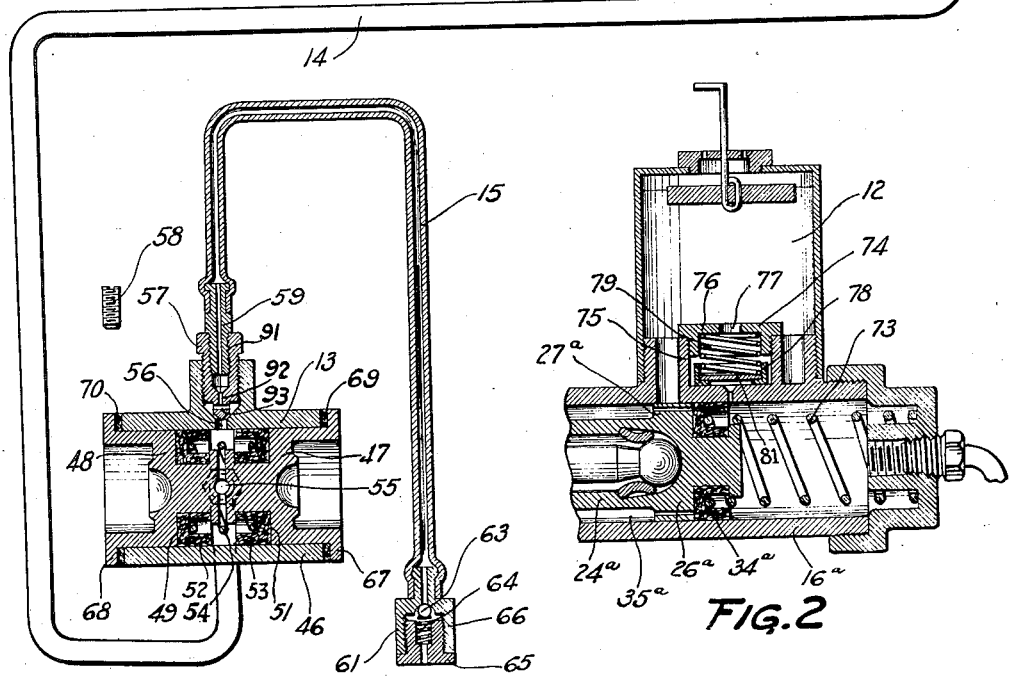

The above and other objects and features of the invention including various novel and desirable details of construction will be apparent from the following description of the two illustrative embodiments shown in the accompanying drawing, in which;

Figure 1 is a more or less diagrammatic view of a hydraulic brake system showing, the reservoir, master cylinder, wheel cylinder and bleeding hose in section; and Figure 2 is a fragmentary sectional view of a modified form of master cylinder.

The system illustrated in Figure 1 includes a master cylinder 11, a reservoir 12 secured thereto, wheel cylinders such as 13 and suitable liquid pressure lines such as 14 connecting the master cylinder and the wheel cylinder. There is provided a bleeding hose 15 normally detached from the wheel cylinder, but adapted during the bleeding operation to be secured to each wheel cylinder in turn as it is shown attached to one of the wheel cylinders in Figure 1.

The master cylinder generally designated 11 comprises a cylindrical casting 16 formed with a bore 17 of uniform diameter and provided with a relatively large inlet port 18 and a relatively restricted inlet port 19. The forward end of the casting 16 has secured thereto an outlet cap 21 screwed onto the casting and formed with an annular spring seat 22 and with a tapped opening 23 to which there is secured a conduit forming a part of one of the fluid pressure lines 14. The spring 20 seats at its forward end in the seat 22 and bears at its rear end on the piston 26. The spring serves to return the piston 26 when the foot pressure on the pedal is released.

Mounted for reciprocation in the cylinder 16 is a piston 24 formed with a rear head 25 and a forward head 26. Cups 27 and 28 are associated with these heads and are seated in annular grooves 31 and 32 formed in suitable portions of the piston. Split spring collars such as 33 and 34 serve to hold the cups in position in their respective grooves. The head 26 is formed to have a relatively loose fit in the bore 17. By reason thereof, liquid may, when needed, flow from the chamber 35 (formed intermediate the heads 25 and 26) around the head 26 and past the forward cup 28 into the pressure chamber 30.

The piston 24 is hollow and is formed adjacent to its forward end with an enlarged recess 36 into which the spherical head 37 of the piston rod 38 extends. The head 37 is secured in position by a spring collar 39 which is first loosely inserted and subsequently deformed by a punch to fasten the head securely in the recess. The rear end of the cylinder is formed with a groove in which a spring 40 is received, the spring serving to limit the movement of the piston 24. The rear end of the cylinder may be closed by a boot 41 and the reservoir 12 may be provided with a float 42 carrying an indicator 43 by which the level of the liquid in the reservoir is always apparent to the operator.

The wheel cylinder 13 is formed of a substantially cylindrical casting 46 and a pair of pistons 47 and 48, the pistons are formed with annular grooves 49 and 51 in which there are seated annular cup packings 52 and 53 and there may be provided intermediate these packings the spring 54. The pressure line 14 is connected to the interior of the cylinder by a port 55 and for purposes of bleeding there is provided a bleed opening 56 normally closed by a plug 57 and a screw 58. The plug 57 is formed with a relatively large concentric tapped bore 91 into which the screw 58 is normally threaded; with a restricted concentric bore 92 and with a transverse bore 93 intersected by said bore 92. During the bleeding operation, however, the screw 58 is removed as it is shown, the plug 57 is loosened and a bleeding hose 15 is inserted in place of the screw 58. The bleeding hose 15 is provided with a one way outlet valve assembly 61 including a check valve which may consist of a ball 63 normally maintained on its seat by a spring 64 reacting on a plug 65 screwed into the valve casing 66.

The pistons 47 and 48 are formed at their outer ends with flanges 67 and 68 which overlie the ends of the cylinder 46 and which in the "off" position of the brakes clamp packings 69 and 70 to form a fluid tight seal for the wheel cylinder 13. In the normal operation of this embodiment of my invention pressure upon the foot pedal which is attached to the piston rod 38 moves the piston 24 forward in the cylinder 16 and thus forces liquid under pressure through the opening 23 and the pressure line 14. The liquid is thus forced through the port 55 into the wheel cylinder 13, thus spreading the pistons 47 and 48 and through said pistons acting to apply the brake shoes. Release of the pressure upon the pedal allows the return of the piston 24 and the springs on the brakes cause the return of the pistons 47 and 48 to their normal inactive position. While the pistons are in their inactive position the packings 69 and 70 prevent the suction of air in the wheel cylinder. The return of the master piston 24 allows liquid from the reservoir 12 to be drawn through the port 18 past the cup 28 to the chamber 30, thus compensating for temperature changes, etc., but liquid can at no time pass rearwardly from chamber 30 to chamber 35 past the cup 28. Upon the return of the piston to the normal inactive position, any excess liquid may return to the reservoir through the port 19.

In the bleeding operation, pressure upon the foot pedal forces liquid forward through the lines into the wheel cylinders and forces air and liquid out through the hose 15 past the check valve 61. On the return stroke the re-entrance of air is prevented by the check valve 61 and liquid is drawn into the chamber 30 and the forward part of the system past the cup 28.

In the modified form of my invention shown in Fig. 2, the forward head 26a of the piston 24a is extended rearwardly as at 27a so that in the normal inactive position communication is cut off between the reservoir 12a and the recess 35a. A spring 73 is provided for aiding in holding the cup 34a in position, and a spring loaded valve 74 is provided to maintain a predetermined pressure within the system. The valve 74 comprises a well formed by an annular upstanding projection 75 integral with the cylinder 16a; a cap 76 formed with an opening 77 and screwed into the projection 75; a valve member 81; and a spring 79 normally urging the valve member 81 upon its seat 78.

The operation of this embodiment of my invention is similar to that described above. However, a constant pre-determined superatmospheric pressure is maintained in the system by reason of the spring loaded valve 74 and leaks which may develop in the rear part of the cylinder while the apparatus is idle will drain the recess 35a only and will not at the same time drain the reservoir 12.

The master cylinder and reservoir structure disclosed therein is also disclosed and is claimed in my copending application Serial No. 21,953, filed May 17, 1935.

It is to be understood that the above described embodiments of my invention are for the purpose of illustration only and various changes may be made therein without departing from the spirit and scope of the invention.

I claim:

In a hydraulic brake system a wheel cylinder provided with an inlet opening and having an outlet opening formed with a conical valve seat, a plug for said outlet opening provided with a conical end for seating on said valve seat and formed with a longitudinal bore and with a lateral bore adjacent to said conical end intersecting with said longitudinal bore, and a screw normally closing said longitudinal bore whereby when said conical end of the plug is seated on the conical valve seat and the screw is inserted in said plug, a double seal is provided to prevent escape of liquid or ingress of air, but when said plug is moved outwardly of said outlet opening and said screw is removed, liquid may be forced out past said conical end through said lateral bore and through said longitudinal bore to the atmosphere.

EUGENE G. CARROLL.